United States Patent [19]

Skoler

[11] Patent Number: 4,906,784
[45] Date of Patent: Mar. 6, 1990

[54] THERMOPLASTIC POLYETHERKETONES
[75] Inventor: George A. Skoler, White Plains, N.Y.
[73] Assignee: Amoco Corporation, Chicago, Ill.
[21] Appl. No.: 248,241
[22] Filed: Sep. 19, 1988

Related U.S. Application Data
[63] Continuation-in-part of Ser. No. 928,528, Nov. 10, 1986.

[51] Int. Cl.$^4$ .................... C08G 8/02; C08G 14/00
[52] U.S. Cl. .................... 528/125; 528/126; 528/128; 528/219; 528/220
[58] Field of Search ............ 528/125, 126, 128, 219, 528/220

[56] References Cited

U.S. PATENT DOCUMENTS

| | | | |
|---|---|---|---|
| 4,320,224 | 3/1982 | Rose et al. | 528/125 |
| 4,638,044 | 1/1987 | Kelsey | 528/125 |
| 4,774,296 | 9/1988 | Clandinning et al. | 528/125 |

*Primary Examiner*—John Kight
*Assistant Examiner*—M. L. Moore
*Attorney, Agent, or Firm*—Donald M. Papuga; William H. Magidson; Ralph C. Medhurst

[57] ABSTRACT

The invention relates to tough, crystalline polyetherketones, processes for making them and monomers used in their manufacture. The polyetherketones are derived from monomers which provide the repeating polymer unit -(-O-Ph-CO-Ph-CO-Ph-)≧2- in the polymer chain.

The polyetherketones are the etherification reaction product of

X-Ph-CO-Ph-[-CO-Ph-]$_1$-[-Ph-CO-Ph-(-CO-Ph-)$_o$-]$_m$-X wherein X is a halogen such as fluorine and chlorine, l, m and o are individually 0 or 1, with a bisphenol of the formula HO-Ph-(-Y-Ph-)$_p$-OH, wherein p is 0, 1 or 2, -Y- is -CO- or -O- in either occurence, and an aromatic hydroxy halide of the formula HO-Ph-CO-Ph-CO-Ph-X, wherein X is as described above, and wherein -Ph- is 1,4-phenylene, said polyetherketone having an ether to ketone molar ration of less than 2/1 and greater than ½, and an inherent viscosity of at least 0.6.

9 Claims, No Drawings

THERMOPLASTIC POLYETHERKETONES

This application is a continuation-in-part of copending application Ser. No. 06/928,528, filed Nov. 10, 1986.

BACKGROUND OF THE INVENTION

1. Field of the Invention

The invention relates to tough, crystalline aromatic polyetherketones, processes for making them and monomers used in their manufacture. The polyetherketones are derived from monomers which provide the repeating polymer unit —(—O—Ph—CO—Ph—CO—Ph—)$_{\geq 2}$— in the polymer chain.

2. Description of the Prior Art

Polyetherketones are a known class of tough, crystalline engineering plastics that have received renewed attention in recent years because of a need for crystalline thermoplastics having high crystalline melting temperatures ($T_m$), high second order (glass) transition temperatures ($T_g$), substantial inertness to most solvents and excellent moisture stability. These polymers have demonstrated good electrical insulating properties, such as for high service temperature wire insulation, and are finding uses in glass fiber, aromatic polyamide fiber or carbon fiber reinforced composites. Two polyetherketones have been commercialized to date. The first commercial polyetherketone was Stilan TM (made by Raychem Company) having the repeating unit structure 'Ph—O—Ph—CO—("PEK") wherein "Ph" is the 1,4-phenylene unit. Its commercial manufacture ceased in about the mid-1970s. More recently, Imperial Chemicals Industries PLC ("ICI") commercialized a polyetherketone of the repeating unit formula —O—Ph—O—Ph—CO—Ph—

("Peek") called Victrex TM PEEK and has obtained patents thereon, see U.S. Pat. No. 4,320,224, patented Mar. 16, 1982 and European Pat. No. 0 001 879, published Mar. 24, 1982.

As used in this specification, the ether unit will be characterized as E, the ketone (carbonyl) unit will be characterized as K, the fact that combinations of E's and K's are part of a repeating polymeric unit will be designated by a P prefix, and the existance of 1,4-phenylene separating each E and K is to be inferred.

The broadest definition of polyetherketones includes a vast array of unit structures therein, including ether sulfone and biphenylene units. However, from a practical standpoint, the commercial polyetherketones are made up of simple repeat units because even the simplest polyetherketones are very expensive to make. The high costs of the polyetherketones stem from the high processing cost to keep the polymerizing, highly crystalline polymer in solution until the desired molecular weight is achieved (thereby avoiding crystallization out of solution prematurely) and/or the reliance on the use of expensive fluorine containing monomeric starting materials. This is amplified below.

It is recognized that polyetherketones can be made by two procedures: the electrophilic aromatic displacement or substitution reaction and the nucleophilic aromatic displacement or substitution reaction. The former was used to make Stilan TM and is demonstrated in Dahl, U.S. Pat. No. 3,953,400, patented Apr. 27, 1976, and Dahl U.S. Pat. No. 3,956,240, patented May 11, 1976. Dahl had demonstrated that in the electrophilic reaction, premature crystallization out of solution could be aborted by polymerizing in HF as the solvent. The reactant used for the reaction was the relatively cheaper monocarboxylic acid chloride of diphenylether, i.e., Ph—O—Ph—COCl ("Ph—" is phenyl). The catalyst was a Friedel-Crafts catalyst such as boron trifluoride. Apparently, the corrosive nature of HF caused the cessation of the commercial operation by Raychem Company.

The nucleophilic displacement process for making polyetherketones is well characterized by Johnson et al., Journal of Polymer Science, Part A-1, vol. 5, pages 2375-2398, 1967. ICI adapted that process for making Victrex TM PEEK by the condensation reaction of hydroquinone with the expensive 4,4'-difluorobenzophenone. Premature crystallization was avoided by (a) the use of diphenyl sulphone as the solvent, and (b) advancing polymerization by temperature increase but always below the solvent's boiling point.

ICI's patented technology as it relates to wholly polyetherketones depends on the condensation of hydroquinone and 4,4'-difluorobenzophenone. The only difluorobenzenoid compound used in the examples of the ICI patent is 4,4'-difluorobenzophenone. The only bisphenol other than hydroquinone used in the examples of the ICI patent is 4,4-dihydroxybenzophenone. As a consequence, the polymers there illustrated are limited in the scope of their $T_m$ and $T_g$; the range of $T_m$'s being 334° C. to 345° C., and $T_g$'s being 140° C. to 154° C.

The ether to ketone molar ratio ("E/K ratio") of a polyetherketone composed of copolymeric ether and ketone units joined only by 1,4-phenylene units is a most significant factor in characterizing physical properties. It has been established that ordered or random polyetherketones of the same E/K ratio have the same $T_m$ and $T_g$ regardless of the ether and ketone arrangement. For example, each of the polyetherketones —O—Ph—CO—Ph— and —O—Ph—O—Ph—CO—Ph—CO—Ph—have the E/K ratio of 1 and they have the same $T_m$ and $T_g$. As is the case with all of such polyetherketones of appropriate molecular weights, they have comparable service properties ("service" in the sense of commercial uses). However, a demand has arisen for polyetherketones having $T_m$s greater than that of PEEK, indeed, even greater than PEK. Because $T_g$s track $T_m$s in these polymers, higher $T_g$s are a direct benefit of the higher $T_m$s. Therefore, it would be most desirable to be able to make polyetherketones of a variety of E/K ratios, such as below that of PEEK or PEK, as needed, from a limited number of simple monomers beyond the scope of the prior art.

The polyetherketones that have been commercially manufactured, namely ICI's Victrex TM PEEK and Raychem's Stilan TM , are/were made from a minimum of starting materials. Victrex TM PEEK is made from hydroquinone and 4,4'-difluorobenzophenone and Stilan TM was made from p-phenoxybenzoylchloride. The starting materials in both cases are expensive; however, because of the cost of making difluorobenzophenone, Stilan TM on a raw-material basis is perceived to be the cheaper polymer. Because Stilan TM has the lower E/K ratio of 1 as contrasted to 2 for PEEK, Stilan TM has a higher $T_m$ and $T_g$, making it a superior performing polymer. One monomer is used in making Stilan TM and that is desirable from a cost/production standpoint. Because hydroquinone is a commercially available chemical, only one chemical has to be specially made for making PEEK, namely, 4,4'-difluorobenzophenone. The commercial availability of that monomer based on a broader consumption than PEEK manufacture would significantly lower the cost of PEEK. These cost factors are important to the eventual consumption and utility of the polymers. In order to produce polyetherketones having higher, intermediate or lower E/K ratios than PEK and PEEK, it is necessary to make expensive monomers, other than those cited above, or to make and introduce new monomers to the monomer compositions used to make PEK and PEEK.

However, the Friedel-Crafts process has already been established as a difficult one for making a commercially acceptable polyetherketone. Its operation to make a homopolymer has been shown by Raychem to be hazardous, thus to make a copolymer with a variance on structure to the same or different E/K ratio of the PEK polymer, by the same process, can be accurately termed a treacherous endeavor, subject to significant branching or crosslinking problems. The Friedel-Crafts process exploits lower cost monomers, and indeed, if it could be effectively practiced by directly reacting phosgene with aromatic ethers, the advantage in monomer cost over the nucleophilic route would be significant enough to eliminate the latter route as a potential competitor. However, such is not the case and the only existing commercial route to such polyetherketones is by the nucleophilic process.

U.S. Pat. No. 4,320,224 describes a number of monomers that can be used in making polyetherketones having an E/K ratio below 2. Specifically, they are the following:

A. Bisphenols
    4,4'-dihydroxybenzophenone
    4,4'-dihydroxydiphenylsulphone
    2,2'-bis-(4-hydroxyphenyl)propane
    4,4'-dihydroxybiphenyl
    hydroquinone B. Dihalides
    4,4'-dichlorodiphenylsulphone
    4,4'-difluorodiphenylsulphone
    4,4'-dichlorobenzophenone
    4,4'-difluorobenzophenone
    bis-4,4'-(4-chlorophenylsulphonyl)biphenyl
    bis-1,4-(4-chlorobenzoyl)benzene
    bis-1,4-(4-fluorobenzoyl)benzene
    4-chloro-4'-fluorobenzophenone
    4,4'-bis-(4-fluorobenzoyl)biphenyl
    4,4'-bis-(4-chlorobenzoyl)biphenyl Of the listed bisphenols, only hydroquinone and 4,4'-dihydroxybenzophenone will generate a polyetherketone which is wholly ether, 1,4-phenylene and ketone units. Of the listed dihalides, only 4,4'-dichloro or difluoro or chlorofluoro benzophenone, or bis-1,4-(4-chloro or fluorobenzoyl)benzene will do the same. It is recognized that only a small proportion of the dihalide used can be the chloride variant without adversely affecting the properties of the polymer produced.

However, by selecting the three reactants

| Bisphenol | Dihalide |
|---|---|
| hydroquinone | 4,4'-difluorobenzophenone |
|  | bis-1,4-(4-fluorobenzoyl)benzene | one may generate polyetherketones having E/K ratios extending between 2 and 1, achieving the full range of $T_m$'s and $T_g$'s attending those ratios. However, U.S. Pat. No. 4,320,224 specifies that at least 50 mole % of the polymer must be made from 4,4'-difluorobenzophenone. However, that preference is not viewed to be a technical limitation, merely one made to attempt to differentiate for the purpose of patentability.

There is described herein polyetherketone compositions and a process which can (a) avoid infringing any of the prior art patents such as U.S. Pat. Nos. 3,953,400, 3,956,240 and 4,320,224, and their foreign counterparts; (b) provide physical properties which are at least equal to such prior art polyetherketones; and (c) be made or practiced by the use of monomers potentially less expensive than those of the prior art. The invention has the benefit of being capable of making random copolymers or block copolymers with special benefits in each case. In the case of block copolymers, the invention can generate polymers having higher rates of crystallization, higher $T_m$s and higher $T_g$s than comparable E/K ratio random or ordered copolymers. The invention allows the production of polyetherketones having E/K mole ratios from about 2 to as low as about 0.5.

(e) Summary of the Invention

This invention is directed to tough, crystalline polyetherketones containing: (a) a linear molecular chain of ether and ketone units separated by 1,4-phenylene units; (b) an ether to ketone molar ratio of less than about 2/1 and greater than about ½; (c) the units

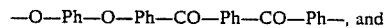

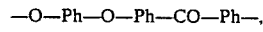

wherein n is at least 2, most desirably at least 3, and —Ph— is 1,4-phenylene; and (d) an inherent viscosity of at least about 0.6.

The polyetherketones are the etherification reaction product of

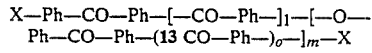

wherein X is a halogen such as fluorine and chlorine, l, m and o are individually 0 or 1, with a bisphenol of the formula

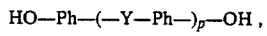

wherein p is 0, 1 or 2, —Y— is —CO— or —O— in either occurrence, and an aromatic hydroxy halide of the formula

wherein X is as described above, z is a positive integer of at least one, and wherein —Ph— is 1,4-phenylene, said polyetherketone having an ether to ketone molar ratio of less than 2/1 and greater than ½ and an inherent viscosity of at least 0.6.

These polyetherketones have crystalline melting points ($T_m$s) greater than 334° C. (i.e., the $T_m$ of PEEK) ranging to less than about 384° C. (i.e., the $T_m$ of a homopolymer of —O—Ph—CO—Ph—CO—Ph— units ("PEKK")). The $T_g$ of the polymers of this invention fall between the $T_g$s of PEEK and PEKK.

Description of the Preferred Embodiments

The thrust of the invention resides in the existence of the repeat unit —(—O—Ph—CO—Ph—CO—Ph—)$_n$— ("n-PEKK") in the polyetherketone and how such is achieved. The invention contemplates the use of enough n-PEKK in the polymer to achieve a polyetherketone having a $T_m$ higher than a PEEK homopolymer having a comparable inherent viscosity, and preferably, sufficient of the n-PEKK to generate a block copolyether ketone in which a block is present which is composed of only n-PEKK, which block copolyether ketone has a rate of crystallization in the melt and/or a $T_m$ or $T_g$ which is higher than a random copolymer or a homopolymer having the same E/K molar ratio.

An advantage of this invention can be appreciated from the following illustration. In order to achieve a polyetherketone made of only —O—, —CO—, and 1,4-phenylene units having a $T_m$ and $T_g$ greater than PEEK, one must incorporate more ketone (—CO—) units in the polymer. The effect is to lower the E/K below 2/1. One way to do this would be to react hydroquinone, 4,4'-difluorobenzophenone and F—Ph—CO—Ph—CO—Ph—F

[bis- 1,4-(4-fluorobenzoyl)benzene].

In doing this, the polymer ends up containing the unit structures, characterized by ether ("E") and ketone ("K") units only, the 1,4-phenylene is inferred, which follows:

1. EEK and
2. EEKK. Because formula 2. has an E/K ratio of 1, the E/K ratio of this copolyetherketone can never be 1 and certainly not less than 1. Such a copolyetherketone could never be made to have a $T_m$ and $T_g$ as high as that of the homopolyetherketone of the recurring unit structure

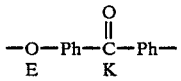

which can be made by a variety of ways, see British Patent Specification No. 1 414 421, U.S. Pat. No. 3,953,400 and U.K. Patent Application No. 2 102 420A. Little advantage exists for making that complex copolymer when the superior polymer in terms of higher $T_m$ and $T_g$ is achieved with the less monomeric reactant homopolyether. Another way to attempt to achieve a higher ketone content using hydroquinone as a reactant would be to react it with bis-1,4-(4-fluorobenzoyl)benzene. The resulting polymer has an E/K of 1, which makes it the equal of PEK. Such would not lower the E/K ratio below 1. One can speculate on another approach to making a polymer having an E/K ratio less than 1 as, for example, the reaction of the following:

HO—Ph—OH (hydroquinone)

F—Ph—CO—Ph—CO—Ph—F

[bis-1,4-(4-fluorobenzoyl)benzene]

HO—Ph—CO—Ph—CO—Ph—OH

[bis -1,4-(4-hydroxybenzoyl)benzene].

This would result in a copolyetherketone containing the following structures:

EEKK
EKKEKK.

With this combination of monomers one could never attain an E/K ratio of 1, and 2 expensive monomers would have to be made.

It is apparent that to produce copolyetherketones having an E/K ratio which can range from just below 2 to just above 0.5 from the same monomeric combination and by simply altering the proportion of one to another is not depicted by the art prior to this invention. This invention can achieve this result using only simple monomeric structures, thus simplifying and making less costly the production of copolyetherketones of such a range of E/K.

The invention is achieved by the nucleophilic displacement reaction between a monomer mixture comprising H—(—O—Ph—CO—Ph—CO—Ph—)$_z$—X, a bisphenol and a dihalide.

In particular, the invention comprises the reaction of a dihalobenzoid compound of the formula X—Ph—CO—Ph—[—CO—Ph—]$_l$——[—O—Ph—(CO—Ph—(—CO—Ph—)$_o$—O]$_m$—X wherein X is a halogen such as fluorine and chlorine, l, m and o are individually 0 or 1; with an aromatic diol of the formula HO—Ph—(—Y—Ph—)$_p$—OH, wherein p is 0, 1 or 2, Y is —CO— or —O— in each occurrence and an aromatic hydroxy halide of the formula H—(—O—Ph—CO—Ph—CO—Ph—)$_z$—X, wherein X and z are as described above, and wherein —Ph— is 1,4-phenylene.

The resulting polyetherketones, in each case, have an ether to ketone molar ratio (E/K) of less than 2/1 and greater than ½ and an inherent viscosity of at least 0.6 with the following provisos: toughness, crystallinity and containing: (i) a linear molecular chain of ether and ketone units separated by 1,4-phenylene units; and (ii) the units —(—O—Ph—CO—Ph—CO—Ph—)$_n$—, —O—Ph—O—Ph—CO—Ph—CO—Ph—, and —O—Ph—O—Ph—CO—Ph—, wherein n is at least 2, most desirably at least 3, and —Ph— is 1,4-phenylene.

Inherent viscosity as used herein means the same and is determined the same as is inherent viscosity in U.S. Pat. No. 4,320,224, i.e., measured at 25° C. on a solution of the polymer in concentrated sulphuric acid of density 1.84 g.cm$^{-3}$, the solution containing 0.1 g. of polymer/100 cm$^3$ of solution.

The distinction of the process of this invention is the use as a reactant in making the polyetherketone of the hydroxyhalide of the formula HO—Ph—CO—Ph—CO—Ph—X (4-hydroxybenzoyl-4'-halobenzophenone)

in which X and Ph are as previously defined. The hydroxy halide is made according to standard Friedel-Crafts alkylation procedures such as defined in U.K. Patent Application No. 2 102 420 A or European Patent Application No. 0 069 598, both filed July 7, 1982, and both based on U.S. patent application Ser. No. 281,526, filed July 8, 1981, I Reichel et al., Chemical Abstracts, Vol. 55, p. 12340, and Chemical Abstracts, 1958, p. 16281. A proposed multi-step procedure for making such hydroxyhalides is as follows:

To a mixture formed by adding 0.4 moles of $AlCl_3$ to 0.6 mole of sym-tetrachloroethane are sequentially added, with stirring, 0.46 mole of nitromethane, 0.2 mole of terephthalic acid (reagent grade) and gradually 0.2 mole of phenol. The initial temperature of the resulting mixture is 25° C. and the temperature is raised to about 30° C. after 2 hours, then to about 40° C. after 4 hours, and about 1 hour later or until all HCl evolution is complete, the resulting mixture is allowed to stand overnight at room temperature. The mixture is treated with dilute sulfuric acid and the sym-tetrachloroethane is distilled from the mixture. The recovered solid is redissolved in boiling 10% $Na_2CO_3$, filtered, reprecipitated with concentrated HCl, and finally washed with water. About a 50% yield of 4-(4-hydroxybenzoyl) benzoic acid of good purity is obtained.

To a mixture of 242 g. (1.00 mole) 4-(4-hydroxybenzoyl) benzoic acid and 150 g. fluorobenzene, cooled in a dry ice/acetone bath, is added 325 ml. of anhydrous hydrofluoric acid and a pre-cooled magnetic stirrer bar. The partly frozen reaction mixture is removed from the bath and stirred at −20° C. to −15° C. for 15 minutes yielding two liquid layers. Boron trifluoride is periodically admitted at a pressure of about 15 psi resulting in a temperature rise to 18° C. in about 15 minutes. The reaction vessel is reimmersed in the dry ice/acetone bath to lower the temperature. Admission of boron trifluoride is continued at −4° C. to +6° C. for 40 minutes until absorption and exotherm cease. The bath is removed and boron trifluoride is admitted at a pressure of about 30 psi. The reactor is warmed to room temperature by placing it under a lamp for about 1 hour, at which point about ¼ of the top layer is consumed. The reactor is held at room temperature until all of the top layer is consumed, about 1 hour 15 minutes. The reaction solution is stirred for an additional 18 hours and degassed. The resulting reaction solution is removed and evaporated to dryness at room temperature. The residue is stirred with excess ice water and leached with water overnight to yield a product which is recrystallized from about 650 ml. of methanol by slowly adding about 210 ml. of water at reflux, resulting in a crystalline product. The product is further purified by recrystallization from glacial acetic acid with addition of 150 ml. of water at reflux, followed by washing the resulting filter cake with water, and recrystallizing from about 1500 ml. toluene to give about 200 g. of colourless crystals of 4-hydroxybenzoyl-4'-fluorobenzophenone.

Alternatively, the hydroxy halide may be made by a one-step procedure, such as -

To a mixture formed by adding 0.4 moles of $AlCl_3$ to 0.6 mole of sym-tetrachloroethane are sequentially added, with stirring, 0.46 mole of nitromethane, 0.2 mole of terephthalic acid (reagent grade) and gradually 0.2 mole of phenol and 0.2 mole of fluorobenzene. The initial temperature of the resulting mixture is 25° C. and the temperature is raised to about 30° C. after 2 hours, then to about 40° C. after 4 hours, and about 1 hour later or until all HCl evolution is complete, the resulting mixture is allowed to stand overnight at room temperature. The mixture is treated with dilute sulfuric acid and the sym-tetrachloroethane is distilled from the mixture. The recovered solid is redissolved in boiling 10% $Na_2CO_3$, filtered, reprecipitated with concentrated HCl, and finally washed with water. A significant yield of 4-hydroxybenzoyl-4'-fluorobenzophenone of good purity is obtainable Another one-step procedure is the following:

To a mixture of 242 grams (1.00 mole) 4-(4-hydroxybenzoyl) benzoic acid, 96 g. fluorobenzene and 94 g. of phenol, cooled in a dry ice/acetone bath, is added 325 ml. of anhydrous hydrofluoric acid and a pre-cooled magnetic stirrer bar. The partly frozen reaction mixture is removed from the bath and stirred at −20° C. to −15° C. for 15 minutes yielding two liquid layers. Boron trifluoride is periodically admitted at a pressure of about 15 psi resulting in a temperature rise to 18° C. in about 15 minutes. The reaction vessel is reimmersed in the dry ice/acetone bath to lower the temperature. Admission of boron trifluoride is continued at −4° C. to +6° C. for 40 minutes until absorption and exotherm cease. The bath is removed and boron trifluoride is admitted at a pressure of about 30 psi. The reactor is warmed to room temperature by placing it under a lamp for about 1 hour, at which point about ¼ of the top layer is consumed. The reactor is held at room temperature until all of the top layer is consumed, about 1 hour 15 minutes. The reaction solution is stirred for an additional 18 hours and degassed. The resulting reaction solution is removed and evaporated to dryness at room temperature. The residue is stirred with excess ice water and leached with water overnight to yield a product which is recrystallized from about 650 ml. of methanol by slowly adding about 210 ml. of water at reflux, resulting in a crystalline product. The product is further purified by recrystallization from glacial acetic acid with addition of 150 ml. of water at reflux, followed by washing the resulting filter cake with water, and recrystallizing from about 1500 ml. toluene to give about 200 g. of colourless crystals of 4-hydroxybenzoyl-4'-fluorobenzophenone.

The last two procedures are subject to making monomeric mixtures of the following structures:

(a.) HO—Ph—CO—Ph—CO—Ph—X
(b.) HO—Ph—CO—Ph—CO—Ph—OH
(c.) X—Ph—CO—Ph—CO—Ph—X.

The last procedure is prone to forming more of by-product monomers (b.) and (c.). Such by-products can be effectively used in the practice of the invention as will be explained below. Typically, a monomer (a.) will comprise at least 85 mole percent of the monomeric mixture, preferably at least 95 mole percent of the monomeric mixture.

Thus, the hydroxyhalide monomers are obtainable by conventional electrophilic substitution reactions in the art and, in particular, by the employment of conventional Friedel-Crafts catalysis. The reactions may be carried out equivalently with any of the halobenzenes, such chlorobenzene or fluorobenzene. The catalyst may be weak or moderate Lewis acids, and the reactions may be carried out in the presence of about equivalent amounts of Lewis base(s) with a conventional solvent. The reaction temperature is preferably kept below about 100° C., more desirably below about 50° C., and typically, above about −20° C., preferably above about 0° C.

The hydroxyhalide of the formula H—(—O—Ph—CO—Ph—CO—Ph—)$_z$—X, where z has a value greater than one is achieved by the ether intracondensation of the monomer where z has a value of 1, such as described hereinafter for the manufacture of block copolymers, except that the hydroxyhalide is the sole reactant. Preferebly, the intracondensation is limited such that z is not greater than about 100, more preferably not greater than about 50 and most preferably not greater than about 25. In the typical case, z will range from about 2 to about 15.

The polyetherketones as characterized herein are tough as defined by the hinge test of U.S. Pat. No. 4,320,224, and crystalline in that the polymer is crystalline from the melt and exhibits a T$_m$. They are formed by the standard procedures for effecting polyarylether formation by the nucleophilic displacement or substitution reaction such as described in U.S. Pat. No. 4,108,837, patented Aug. 22, 1978, U.S. Pat. No. 4,320,224, and Canadian Pat. No. 847,963.

The polymerization reaction may be carried out by providing the reactants to the reactor simultaneously in the presence of the reaction solvent, alkali metal typically as an alkali metal salt, or in a sequence which alters the structure of the polymer, such as changing the polymer structure from a completely random copolymer to an essentially block copolymer, or vice versa. For example, all but one of the reactants can be reacted to form a prepolymer which is further polymerized in the presence of the last added reactant. Because the polymer is subject during polymerization to transetherification by virtue of an attack on an ether bonded carbon atom activated by carbonyl, a certain degree of molecular rearrangement occurs. The E/K ratio of the polymer is unaffected by transetherification. In the formation of block units, there can occur some low level of transetherification which impacts on the constancy of the block's chemical characterization, but not on the persistence of block formation, and hence, the block copolymer will exhibit the special attributes that block formation contributes.

A significant facet of the invention is the impact that the unit formula —(—O—Ph—CO—Ph—CO—Ph—)$_2$—(equal to or greater than 2) has on physical properties. n-PEKK provides an E/K ratio of ½ which, as a homopolymer, is reported to have a T$_m$ of 384° C. That T$_m$ borders on the maximum T$_m$ one can have for injection molding without decomposition of the polymer. Thus, the polymer of this invention incorporates units which have an E/K ratio of ½. The remaining polymer units generate a E/K ratio of more than ½. By balancing the proportion of the E/K units at ½ to the E/K units greater than ½, one can dictate the T$_m$ and T$_g$ of the polymer extensively from above about 334° C. to below about 384° C. In the preferred practice of this invention, the polyetherketones of the invention have a T$_m$ of about 340° C. to about 380° C. To achieve this, one either makes a random or ordered copolymer having the requisite E/K ratio for a given T$_m$ or a block copolymer having a somewhat lower E/K ratio and the same T$_m$.

Thus, the amount of the monomer HO—Ph—CO—Ph—CO—Ph—X used in the reaction is very important to the polymer's physical properties.

The copolyetherketones of this invention are elite high performance engineering polymers; consequently, they fill a market niche which is relatively small for the plastics industry. Under such circumstances, it is economically impractical to add the cost of facilities for making a small amount of monomer reactant for the limited market demand of the copolyetherketone. It is important to appreciate that the ready availability of a monomer reactant will be a significant factor in monomer reactant selection.

A wide variety of monomer reactants are available to make the copolyetherketones of this invention.

The typical and commercially available reactants for polyetherketones are hydroquinone and 4,4'-difluorobenzophenone. They are desirable for use in this invention as well. Other reactants useful in the practice of this invention are- A. Bisphenols
1. HO—Ph—O—Ph—OH
2. HO—Ph—CO—Ph—OH
3. HO—Ph—CO—Ph—CO—Ph—OH
4. HO—Ph—CO—Ph—CO—Ph—CO—Ph—OH B. Dihalides
1. F—Ph—CO—Ph—CO—Ph—F
2. F—Ph—CO—Ph—CO—Ph—CO—Ph—F
3. F—Ph—CO—Ph—CO—Ph—CO—Ph—F The various reactants suitable for use in the practice of this invention encompasses those reactants described in the prior art such as U.S. Pat. No. 4,320,224, Johnson et al., supra, and U.K. Patent Application No. 2 102 420 A, which contain only the functional halide and/or hydroxyl group, 1,4—phenylene units and ether oxygen or carbonyl, or both of them.

The important reactants for the practice of this invention are the hydroxyl halides described above. They are used in the process in amounts which will provide a T$_m$ polyetherketone as described above.

This invention recognizes the importance of using commercially available monomers to make a desirable polyetherketone. A desirable, tough, crystalline polyetherketone is defined for the purpose of this invention as having a T$_m$ of 340° C. or higher, up to about 380 ° C. and a T$_g$ higher than 140° C.

With the foregoing in mind, the most desirable reactants are hydroquinone, 1,4-difluorobenzophenone and the hydroxyhalide of this invention, preferably the hydroxyfluoride of the formula

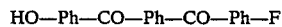
HO—Ph—CO—Ph—CO—Ph—F with or without small amounts of

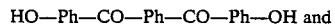
HO—Ph—CO—Ph—CO—Ph—OH and

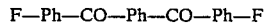
F—Ph—CO—Ph—CO—Ph—F which constitute by-products in the manufacture of the hydroxyfluoride. Preferably, not more than 15 mole % of the composition comprising the manufactured hydroxyfluoride (or the generic hydroxyhalide) is one or both of these by-products. However, the use of these by-products can be very desirable so long as there is an appropriate stoichiometric balance between the hydroxyl and fluoride groups present during polymerizatin to allow attainment of the desired molecular weight.

The properties of the copolyetherketone are dictated, as stated before, by the E/K ratio and such is controlled by the reactant selection and the proportion of E/K each reactant brings to the completed copolymer. Anytime one selects monomers which provide the extremes in respect to E/K ratio, then it is possible to tailor the E/K ratio anywhere between the extremes. PEEK has a $T_m$ of 334° C. and a $T_g$ of 140° C. (using the method of differential scanning calorimetry) and PEKK is reported to have a $T_m$ of 384° C. Thus, an E/K ratio of 2 corresponds to the properties of PEEK and an E/K ratio of 0.5 or 1/2 corresponds to the properties of PEKK. The $T_m$ and $T_g$ reported for prior art polyetherketones are as follows:

| Polyetherketone | $T_m$ (°C.) | $T_g$ (°C.) |
| --- | --- | --- |
| PEEK | 334 | 140 |
| PEK | 367 | 154 |
| PEKK | 384 | |
| P(EEK)(EKEK)[1] | 345 | 154 |

[1]See Example 14 of U.S. Pat. No. 4,320,224, an E/K ratio of 4/3 or 1.33.

The process for condensing the aforementioned reactants to make the polyetherketone involves mixing the reactants in a reaction diluent such as a solvent, and bringing the mixture continually to a temperature whereby the condensation reaction proceeds to generate a copolyetherketone of the desired molecular weight as evidenced by its inherent viscosity. It is desirable to achieve an inherent viscosity of at least 0.6, though an inherent viscosity of at least 0.7 is preferred. It is more desirably to achieve an inherent viscosity of at least about 0.9, up to about 2.0, typically not in excess of 1.8.

The polycondensation reaction is conducted in a solvent such as an aromatic sulfone, e.g., diphenylsulfone or a diluent-solvent combinations of sulfolane-diphenylether. Other aromatic sulfone solvents include dibenzothiophen dioxide, phenoxathiin dioxide and 4-phenylsulfonylbiphenyl. Diphenylsulfone is the preferred solvent.

The condensation is carried out at temperatures between 130° C. and 425° C. Initially, the temperatures should be kept low to avoid loss of reactant which is rather volatile and to minimize possible side reactions involving volatile reactants. The temperature is raised in stages or continuously to a level such that the final polymer is in solution at any intermediate stage. This can serve as an indication that the full extent of the reaction has occurred at that temperature.

The polycondensation is conducted using at least one alkali metal salt, such as carbonate or bicarbonate. The alkali metal salt is preferably selected from sodium, potassium, rubidium and cesium salts. The use of sodium carbonate or bicarbonate alone is excluded because such use results in the formation of a brittle polymer of low molecular weight and poor color (e.g. dark grey). Mixtures of alkali metals especially when in the form of the carbonates and/or bicarbonates may advantageously be employed as well. In particular, it may be advantageous to use a major amount of a carbonate or bicarbonate of sodium in admixture with a minor amount of a carbonate or bicarbonate of an alkali metal of higher atomic number as the polymer properties are improved in comparison to when sodium or potassium (or higher alkali metal) carbonate or bicarbonate is used alone.

Thus, the use of a mixture of sodium carbonate or bicarbonate with a very small amount of a carbonate or bicarbonate of a higher alkali metal provides a tough polymer of high molecular weight and good color (white or off-white).

According to U.S. Pat. No. 4,320,224-

"The use of a mixture of sodium carbonate or bicarbonate with a very small amount of a carbonate or bicarbonate of a higher alkali metal is also advantageous in comparison to the use of potassium (or higher alkali metal) carbonate or bicarbonate alone. Thus, while the use of potassium (or higher alkali metal) carbonate or bicarbonate alone yields a tough polymer of IV at least 0.7 and good color (and so is within the scope of the present invention), we have found that if the polycondensation is carried out on a scale larger than a small laboratory scale, then an undesirably high gel content (i.e. material which becomes swollen by, but does not dissolve, in sulphuric acid) in the polymer may sometimes be obtained; also the reaction vessel, if made of stainless steel, becomes discolored with a dark coating which must be removed before the next polymerization in the vessel. The use of a mixture of sodium and potassium (or higher alkali metal) carbonates or bicarbonates provides a polymer of little or no gel content and does not incur discoloration of a stainless steel reaction vessel when polycondensation is carried out on a large scale. The use of such a mixture is additionally advantageous in that sodium carbonate (or bicarbonate) is less expensive in our experience than the carbonates (or bicarbonates) of higher alkali metals and is required in a smaller amount by weight to produce an equivalent concentration of alkali metal on account of its lower molecular weight.

"The amount of higher alkali metal carbonate or bicarbonate in the mixture is preferably such that there are 0.001 to 0.2, preferably 0.005 to 0.1 gram atoms of the higher alkali metal per gram atom of sodium. Particularly effective combinations include sodium carbonate or bicarbonate in admixture with potassium or casium carbonates. Sodium carbonate in admixture with potassium carbonate is most preferred.

"The total amount of alkali metal carbonate or bicarbonate employed should be such that there is at least 2 gram atoms of alkali metal per mole of bisphenol i.e., at least 1 atom of alkali metal for each phenol group. An amount less than this (even a very slight deficiency) has been found to result in a brittle polymer of poor color which is not according to the invention. Thus, when using alkali metal carbonate there should be at least 1 mole of carbonate per mole of bisphenol and when using alkali metal carbonate there should be at least 2 moles of bicarbonate per mole of bisphenol. Too great an excess of carbonate or bicarbonate should not be used, however, in order to avoid deleterious side reactions: preferably there is between 1 and 1.2 atoms of alkali metal per phenol group."

The molecular weight of the polymer may be controlled by the use of a slight excess over equimolar of a dihalide or bisphenol reactant. It is preferred to use a slight excess, e.g. up to 5 mole %, of dihalide which results in the favored formation of halide end groups rather than phenate end groups. This provides a polymer having greater thermal stability than one possessing phenate end groups exclusively. Alternatively, the polycondensation may be terminated when the molecular weight has reached the desired level.

The copolyetherketones of this invention may be used wherever engineering polymer are employed. They may be used in various molding application, such as compression, transfer and injection molding. They may be used in carbon fiber, aramid fiber and glass fiber reinforced molded objects or in prepregs which are subsequently molded into useful products. They may be blended (alloyed) with other plastics such as polyetherimides such as Ultem ™ (General Electric Company), other polyetherketones such as PEEK ™, (ICI) and polysulfones such as Udel ™ (Amoco Performance Products, Inc.), and made into a variety of molded products. The fabricated articles made of the copolyether can be used wherever good solvent resistant, hightemperature performance, weatherability, and dielectric properties are of importance. They are excellent plastics for electrical insulation for electrical conductors, viz., wires and cables, circuit board applications, and the like. They may be fabricated into a variety of shapes, e.g., films, fibers and coating.

The following examples are intended to illustrate the invention and not act to limit or define the scope or operability of the invention.

EXAMPLE 1

4,4′-difluorobenzophenone (21.82 g., 0.10M), hydroquinone (11.01 g., 0.10M), 4-hydroxybenzoyl-4′-fluorobenzophenone (32 g., 0.10M) and diphenylsulfone (118 g.) are charged to a 3-necked glass flask equipped with a stirrer, nitrogen inlet and an air condenser. The charge is heated with stirring to 200° C. to form a solution and, while maintaining a nitrogen blanket, anhydrous potassium carbonate (14.0 g., 0.101 M sieved through a 300 um sieve) is added. The temperature is raised to 200° C. and maintained for 1 hour; the temperature is then raised to 250° C. and maintained there for 1 hour; finally, the temperature is raised to 320° C. and maintained for 1 hour, the resulting polymer being in solution by this stage. The mixture is cooled (without end stopping) and the resulting solid reaction product is milled so as to pass through a 500 um sieve. Diphenylsulfone and inorganic salts are removed by washing successively with acetone (twice), water (three times), and acetone/methanol (twice).

The resulting solid polymer is dried at 140° C. under vacuum. The polymer which has the repeat units —[—O—Ph—O—Ph—CO—Ph—]— —[—O—Ph—CO—Ph—CO—Ph—]— has a molecular weight corresponding to an inherent viscosity of about 1.32.

A film, compression molded from the polymer at 410° C. is extremely tough, easily surviving the hinging toughness test, and is almost white in color; the polymer is stable in the melt at 410° C. for over 1 hour. The polymer has a $T_m$ of 367° C. and a $T_g$ of about 157° C.

EXAMPLE 2

4,4′-difluorobenzophenone (21.82 g., 0.10M), hydroquinone (11.01 g., 0.10M), 4-hydroxybenzoyl-4′-fluorobenzophenone (16 g., 0.05M) and diphenylsulfone (118g.) are charged to a 3-necked glass flask equipped with a stirrer, nitrogen inlet and an air condenser. The charge is heated with stirring to 200° C. to form a solution and, while maintaining a nitrogen blanket, anhydrous potassium carbonate (14.0 g., 0.101 M sieved through a 300 um sieve) is added. The temperature is raised to 200° C. and maintained for 1 hour; the temperature is then raised to 250° C. and maintained for 1 hour; finally, the temperature is raised to 320° C. and maintained there for 1 hour, the resulting polymer being in solution by this stage. The mixture is cooled (without end stopping) and the resulting solid reaction product is milled so as to pass through a 500 um sieve. Diphenylsulfone and inorganic salts are removed by washing successively with acetone (twice), water (three times), and acetone/methanol (twice).

The resulting solid polymer is dried at 140° C. under vacuum. The polymer which has the repeat units —[—O—Ph—O—Ph—CO—Ph—]1——[—O—Ph—CO—Ph—CO—Ph—].5 has a molecular weight corresponding to an inherent viscosity of about 1.2.

A film, compression molded from the polymer at 410° C. is extremely tough, easily surviving the hinging toughness test, and is almost white in color; the polymer is stable in the melt at 410° C. for over 1 hour. The polymer has a $T_m$ of 352° C. and a $T_g$ of about 159° C.

EXAMPLE 3

4,4′-difluorobenzophenone (28.34 g., 0.13M), hydroquinone (14.30 g., 0.13M), 4-hydroxybenzoyl-4′-fluorobenzophenone (3.2 g., 0.01M) and diphenylsulfone (118g.) are charged to a 3-necked glass flask equipped with a stirrer, nitrogen inlet and an air condenser. The charge is heated with stirring to 200° C. to form a nearly colorless solution and, while maintaining a nitrogen blanket, anhydrous potassium carbonate (14.0 g., 0.101 M sieved through a 300 um sieve) is added. The temperature is raised to 200° C. and maintained there for 1 hour; the temperature is then raised o 250° C. and maintained for 1 hour; finally, the temperature is raised to 320° C. and maintained for 1 hour, the resulting polymer being in solution by this stage. The mixture is cooled (without end stopping) and the resulting solid reaction product is milled so as to pass through a 500 um sieve. Diphenylsulfone and inorganic salts are removed by washing successively with acetone (twice), water (three times), and acetone/methanol (twice).

The resulting solid polymer is dried at 140° C. under vacuum. The polymer which has the repeat units

[—O—Ph—O—Ph—CO—Ph—]1.3——[—O—Ph—CO—Ph—CO—Ph—].1— has a molecular weight corresponding to an inherent viscosity of about 1.13.

A film, compression molded from the polymer at 400° C. is extremely tough, easily surviving the hinging toughness test, and is almost white in color; the polymer is stable in the melt at 400° C. for over 1 hour. The polymer has a $T_m$ of 340° C. and a $T_g$ of about 140° C.

EXAMPLE 4

4,4′-difluorobenzophenone (21.82 g., 0.10M), hydroquinone (11.01 g., 0.10M), 4-hydroxybenzoyl-4′-fluorobenzophenone (64 g., 0.20M) and diphenylsulfone (123 g.) are charged to a 3-necked glass flask equipped with a stirrer, nitrogen inlet and an air condenser. The charge is heated with stirring to 200° C. to form a nearly colorless solution and, while maintaining a nitrogen blanket, anhydrous potassium carbonate (14.0 g., 0.101 M sieved through a 300 um sieve) is added. The temperature is raised to 200° C. and maintained there for 1 hour; the temperature is then raised to 250° C. and maintained for 1 hour; finally, the temperature is raised to 320° C. and maintained for 1 hour, the resulting polymer being in solution by this stage. The mixture is cooled (without end stopping) and the resulting solid reaction product is milled so as to pass through a 500 um sieve. Diphenylsulfone and inorganic salts are removed by washing successively with acetone (twice), water (three times), and acetone/methanol (twice).

The resulting solid polymer is dried at 140° C. under vacuum. The polymer which has the repeat units
[—O—Ph—O—Ph—CO—Ph—].1—[—O—Ph—CO—Ph—CO—Ph—].2— has a molecular weight corresponding to an inherent viscosity of about 1.3.

A film, compression molded from the polymer at 410° C. is extremely tough, easily surviving the hinging toughness test, and is almost white in color; the polymer is stable in the melt at 410° C. for over 1 hour. The polymer has a Tm of 371° C. and a $T_g$ of about 165° C.

EXAMPLE 5

4,4'-difluorobenzophenone (21.82 g., 0.10M), hydroquinone (11.01 g., 0.10M), 4-hydroxybenzoyl-4-—fluorobenzophenone (192 g., 0.60M) and diphenylsulfone (135 g.) are charged to a 3-necked glass flask equipped with a stirrer, nitrogen inlet and an air condenser. The charge is heated with stirring to 200° C. to form a nearly colorless solution and, while maintaining a nitrogen blanket, anhydrous potassium carbonate (14.0 g., 0.101 M sieved through a 300 um sieve) is added. The temperature is raised to 200° C. and maintained there for 1 hour; the temperature is then raised to 250° C. and maintained for 1 hour; finally, the temperature is raised to 320° C. and maintained for 1 hour, the resulting polymer being in solution by this stage. The mixture is cooled (without end stopping) and the resulting solid reaction product is milled so as to pass through a 500 um sieve. Diphenylsulfone and inorganic salts are removed by washing successively with acetone (twice), water (three times), and acetone/methanol (twice).

The resulting solid polymer is dried at 140° C. under vacuum. The polymer which has the repeat units
ti [—O—Ph—O—Ph—CO—Ph—].1— —[—O—Ph—CO—Ph—CO—Ph—].6— has a molecular weight corresponding to an inherent viscosity of about 1.35.

A film, compression molded from the polymer at 410° C. is extremely tough, easily surviving the hinging toughness test, and is almost white in color; the polymer is stable in the melt at 410° C. for over 1 hour. The polymer has a $T_m$ of 377° C. and a $T_g$ of about 167° C.

EXAMPLE 6

Hydroquinone (11.01 g., 0.10M), 4—hydroxybenzoyl-4'-fluorobenzophenone (192 g., 0.60M and diphenylsulfone (135 g.) are charged to a 3-necket glass flask equipped with a stirrer, nitrogen inlet and an air condenser. The charge is heated with stirring to 200° C. to form a nearly colorless solution and, while maintaining a nitrogen blanket, anhydrous sodium carbonate (20.56 g., 1.94M sieved through a 300 um sieve) and potassium carbonate (1.40 g., 0.01M) are added. The temperature is raised to 200° C. and maintained until the viscosity becomes constant, then 4,4'-difluorobenzophenone (21.82 g., 0.10M is added, and heating is continued and when viscosity increase is noted, heating is maintained for 1 hour; finally, the temperature is raised to 320° C. and maintained for 1 hour, the resulting polymer being in solution by this stage. The mixture is cooled (without end stopping) and the resulting solid reaction product is milled so as to pass through a 500 um sieve. Diphenylsulfone and inorganic salts are removed by working successively with acetone (twice), water (three times), and acetone/methanol (twice).

The resulting solid polymer is dried at 140° C. under vacuum. The polymer which has the repeat units
—[—O—Ph—CO—Ph—]—1—[—O—Ph—O—].1—
—[—O—Ph—CO—Ph—CO—Ph—].6— is a block copolymer of —O—Ph—CO—Ph—CO—Ph— block containing units joined by —O—Ph—CO—Ph—O— block containing units having a molecular weight corresponding to an inherent viscosity of 1.26.

A film compression molded from the polymer at 410° C. is extremely tough, easily surviving the hinging toughness test, and is almost white in color; the polymer is stable in the melt at 410° C. for over 1 hour. The block copolymer has a $T_m$ of 380° C. and a $T_g$ of about 169° C.

I claim:

1. A tough, crystalline copolyetherketone containing (a) a linear molecular chain of ether and ketone units separated by 1,4-phenylene units, (b) an ether to ketone molar ratio of less than 2/1 and greater than ½, (c) the units —(—O—Ph—CO—Ph—CO—Ph—)$_n$—

—O—Ph—O—Ph—CO—Ph—CO—Ph— and

—O—Ph—O—Ph—CO—Ph— wherein n is at least 2, —Ph— is 1,4-phenylene, and (d) an inherent viscosity of at least about 0.6.

2. The polyetherketone of claim 1 containing as well the unit

—O—Ph—O—Ph—CO—Ph—CO—Ph—O—Ph—)$_n$—.

3. The polyetherketone of claim 1 containing as well the unit

—O—Ph—CO—Ph—O—Ph—CO—Ph—CO—Ph—O—Ph—CO—Ph—O—.

4. The polyetherketone of claim 1 wherein —(—O—Ph—CO—Ph—CO—Ph—)$_n$— is part of a block unit making up the polyetherketone.

5. The polyetherketone etherification reaction product of

X—Ph-CO—Ph—[—CO—Ph—]$_2$—[—O—Ph—CO—Ph—(—CO—Ph—)$_m$—X wherein X is a halogen such as fluorine and chlorine, l, m and o are individually 0 or 1, with a bisphenol of the formula HO—Ph—(—Y—Ph—)$_p$—OH .

wherein p is 0, 1 or 2, —Y— is —CO— or —O— in each occurrence, and an aromatic hydroxyhalide of the formula H—[—O—Ph—CO—Ph—CO—Ph—)$_z$—X .

wherein X is as described above, z is a positive integer of at least 1, and wherein —Ph— is 1,4-phenylene, said polyetherketone having an ether to ketone molar ratio of less than 2/1 and greater than ½, and an inherent viscosity of at least 0.6.

6. H—(—O—Ph—CO—Ph—CO—Ph—)$_z$—X, wherein —Ph— is 1,4-phenylene, X is halogen and z is a positive integer of at least one.

7. A mixture of

HO—Ph—CO—Ph—CO—Ph—X,

X—Ph—CO—Ph—CO—Ph—X and

HO—Ph—CO—Ph—CO—Ph—OH.

8. The mixture of claim 7 wherein HO—Ph—CO—Ph—CO—Ph—X comprises at least 85 mole percent of the mixture.

9. The mixture of claim 12 wherein HO—Ph—CO—Ph—CO—Ph—X comprises at least 95 mole percent of the mixture.

* * * * *